US012237956B2

United States Patent
Krebs et al.

(10) Patent No.: US 12,237,956 B2
(45) Date of Patent: Feb. 25, 2025

(54) METHODS, SYSTEMS, AND APPARATUSES FOR NARROWBAND CHANNEL ALLOCATION AND ACCESS

(71) Applicant: APPLE INC., Cupertino, CA (US)

(72) Inventors: Alexander Krebs, Munich (DE); Yong Liu, Campbell, CA (US); Lochan Verma, Danville, CA (US); Jinjing Jiang, Campbell, CA (US); Su Khiong Yong, Palo Alto, CA (US)

(73) Assignee: APPLE INC., Cupertino, CA (US)

( * ) Notice: Subject to any disclaimer, the term of this patent is extended or adjusted under 35 U.S.C. 154(b) by 101 days.

(21) Appl. No.: 18/296,243

(22) Filed: Apr. 5, 2023

(65) Prior Publication Data

US 2023/0412435 A1 Dec. 21, 2023

Related U.S. Application Data

(60) Provisional application No. 63/366,496, filed on Jun. 16, 2022.

(51) Int. Cl.
*H04L 27/20* (2006.01)
*H04W 74/0808* (2024.01)

(52) U.S. Cl.
CPC ..... *H04L 27/2082* (2013.01); *H04W 74/0808* (2013.01)

(58) Field of Classification Search
CPC .......... H04L 27/2082; H04L 27/0006; H04W 74/0808
See application file for complete search history.

(56) References Cited

U.S. PATENT DOCUMENTS

| 11,950,290 | B2 * | 4/2024 | Myung | H04W 74/0808 |
| 2020/0260483 | A1 * | 8/2020 | Bergljung | H04L 5/0053 |
| 2022/0182742 | A1 * | 6/2022 | Bali | H04L 12/2869 |
| 2023/0056736 | A1 * | 2/2023 | Wentink | H04W 74/0808 |

* cited by examiner

*Primary Examiner* — Dac V Ha
(74) *Attorney, Agent, or Firm* — Dorsey & Whitney LLP (57) ABSTRACT

A wireless device may use 2.5 MHz narrow band channel spacing. In some embodiments, clear channel assessment based listen before talk may be used to determine if a channel is idle or busy. In some embodiments, randomized channel access may be achieved using a pseudo random number generator on an allowed list of channels. In some embodiments, an avoid loitering mechanism may be employed to reduce interference with transmitters using the same frequency bands.

20 Claims, 8 Drawing Sheets

METHODS, SYSTEMS, AND APPARATUSES FOR NARROWBAND CHANNEL ALLOCATION AND ACCESS

TECHNICAL FIELD

This application relates generally to wireless communication systems, including narrowband channel configurations for wireless personal area networks.

BACKGROUND

Wireless communication technology uses various standards and protocols to transmit data between wireless communication devices. Wireless communication system standards and protocols can include, for example, wireless personal area networks (WPANs), fine ranging (FiRa), IEEE 802.15.4 standard for Low-Rate Wireless Networks, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by IEEE 802.15, wireless signals can be used to communicate between devices. IEEE 802.15 defines standards addressing wireless networking for the emerging Internet of Things (IoT), allowing these devices to communicate and interoperate with one another. The devices may include mobile devices, wearables, autonomous vehicles, etc.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Some of the goals of a network communication system is to improve data throughput and reduce interference with other signals. Various embodiments herein may be used to improve communications over wireless personal area networks (WPANs). Specifically, embodiments herein may use narrow band channels to increase data transfer.

Embodiments herein describe multiple implementations of narrow band channels. Some embodiments discuss how the narrow band channels may be spaced in the available spectrum. Further, often with radio transmissions there are certain regulatory requirements that must be followed. Some embodiments herein describe implementations to address regulatory requirements using the narrow band channels. Further, some embodiments herein describe methods for WPAN devices to coexist with existing radio devices that use a shared spectrum with the narrow band channels. Specifically, some radio devices using the shared spectrum may include Wi-Fi radio devices.

Various embodiments are described with regard to a wireless device, initiator, or responder. However, reference to a wireless device, initiator, or responder is merely provided for illustrative purposes. The example embodiments may be utilized with any electronic component that may establish a communication interface and is configured with the hardware, software, and/or firmware to exchange information and data over the communication interface. Therefore, the wireless device as described herein is used to represent any appropriate electronic component.

Figure 1:
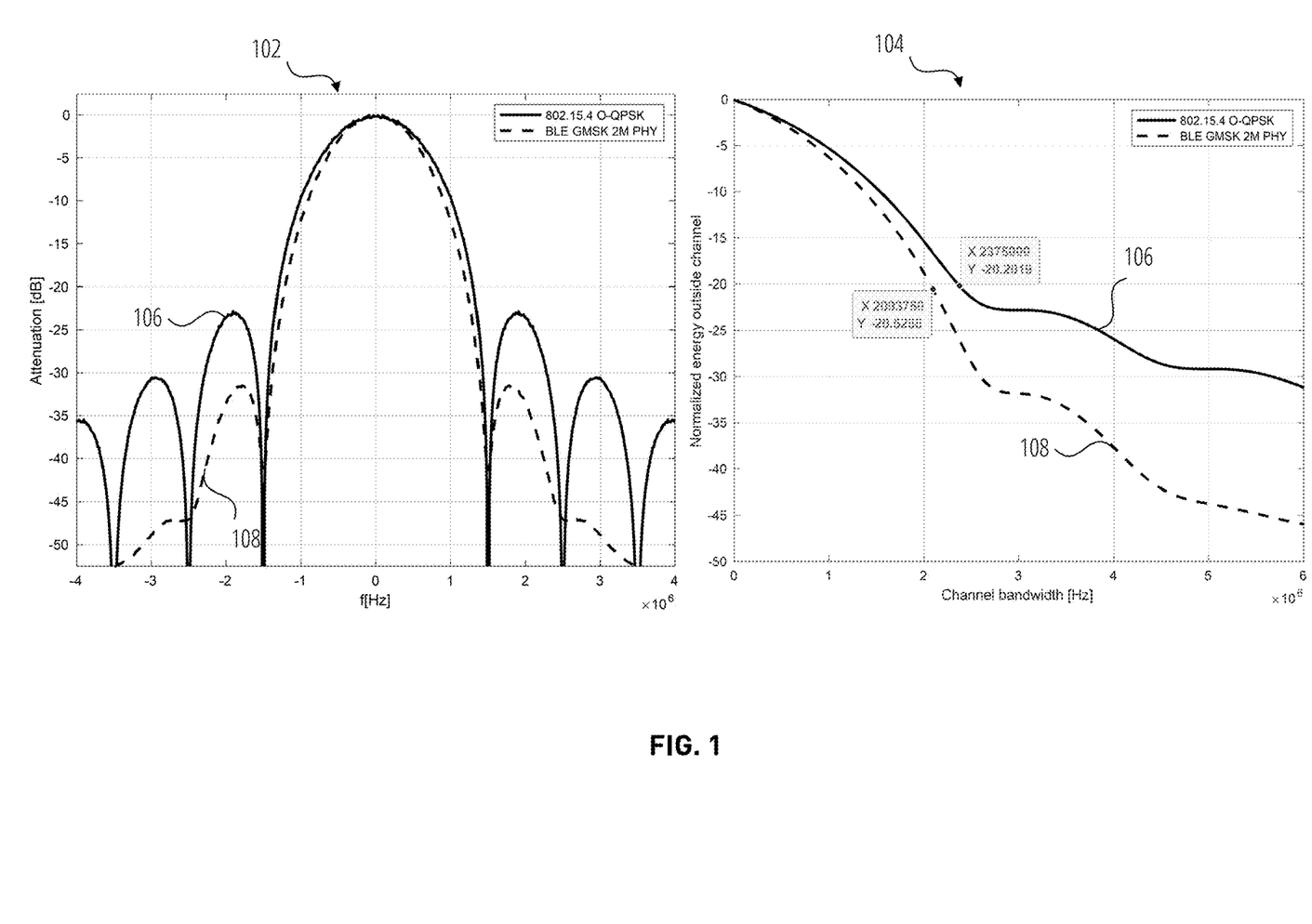
FIG. 1 illustrates a pair of graphs comparing a WPAN signal using Offset-Quadrature Phase Shift Keying (O-QPSK) under the IEEE 802.15.4 standard and a Bluetooth signal in accordance with one or more embodiments.

FIG. 1 is a pair of graphs comparing a WPAN signal 106 using Offset-Quadrature Phase Shift Keying (O-QPSK) under the IEEE 802.15.4 standard and a Bluetooth signal 108. As shown in the first graph 102, the WPAN signal 106 has a similar spectrum to that of Bluetooth signal 108. The second graph 104 illustrates the energy of the WPAN signal 106 spectrum and the Bluetooth signal 108 spectrum.

O-QPSK channels for WPANs are currently aligned in 5 megahertz (MHz) spacings due to legacy reasons in IEEE 802.15.4. However, the legacy allocation is quite wasteful. Spectral efficiency may be increased two-fold by using a 2.5 MHz channel spacing instead. Accordingly, some embodiment herein use 2.5 MHz channel spacing.

The second graph 104 shows that the 2.5 MHz spacing complies with European Telecommunications Standards Institute's (ETSI's) regulatory rules for occupied bandwidth. Occupied bandwidth may be defined as the bandwidth with 99% of the energy of a signal. The bandwidth at −3 dB is less than 1.2 MHz. As shown, the radio for WPANs has an occupied bandwidth of around 2.375 MHZ. Thus, the occupied bandwidth of a narrow band (NB) O-QPSK (e.g., WPAN signal 106) may be less than 2.5 MHz. Accordingly, a 2.5 MHz spacing may be used for the WPAN signal 106 without much of a detrimental effect from interference.

A 2.5 MHz channel spacing rather than a 5 MHz channel spacing may be much more spectrally efficient and still comply with occupied bandwidth restrictions. A wireless device may encode data for transmission over a WPAN and transmit the data using the NB channels. Throughput simulations indicate that the data throughput increases by reducing the channel spacing to 2.5 MHz from 5 MHz, despite the increased amount of interference from neighboring channels. Embodiments herein may use NB channels of 2.5 MHz to support WPANs. The NB channels may be used for narrow-band assisted ultrawideband channel access and channel switching.

Figure 2:
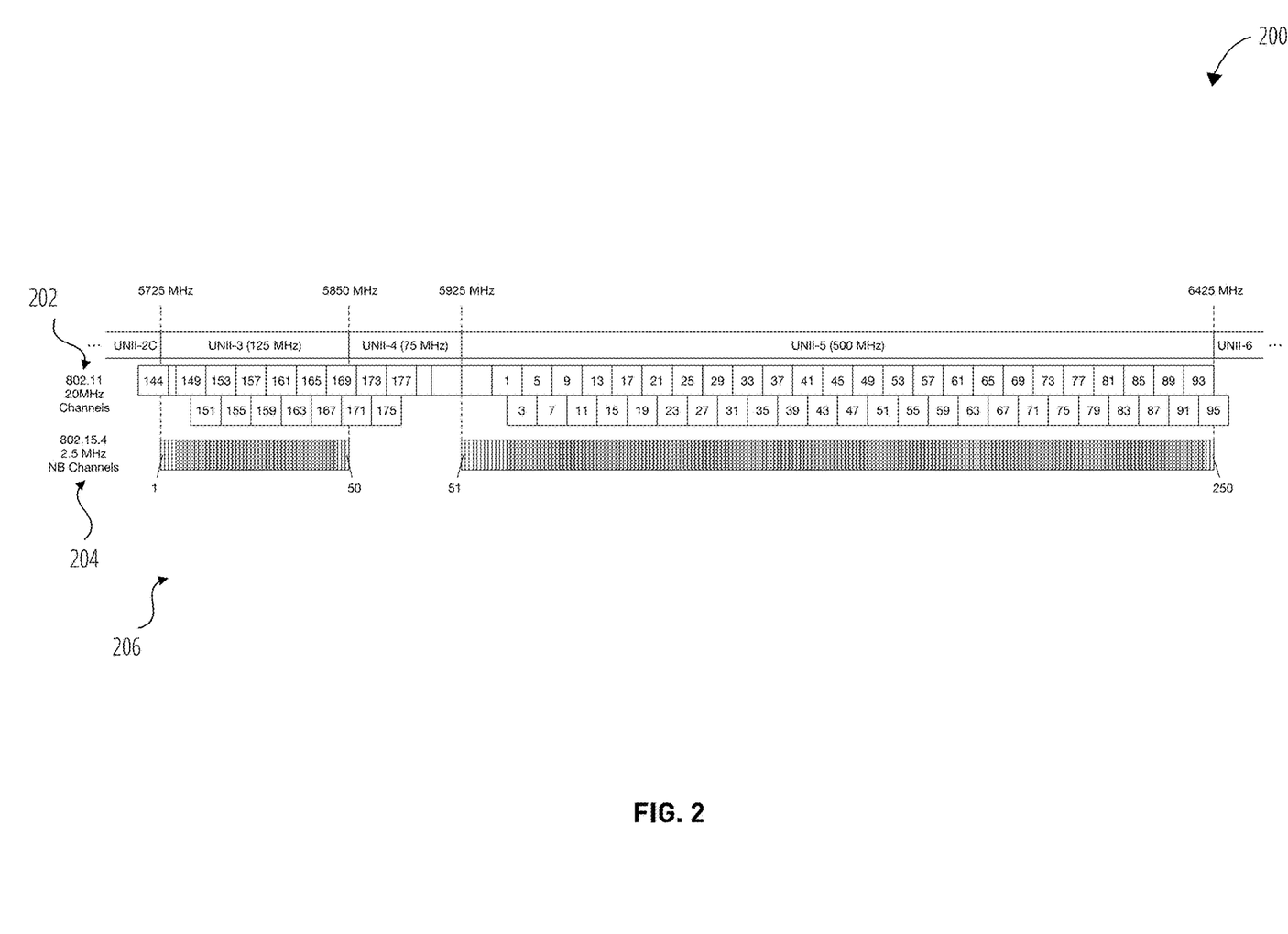
FIG. 2 illustrates a frequency spectrum with Wi-Fi channels and WPAN NB channels allocations in accordance with one or more embodiments.

FIG. 2 illustrates a frequency spectrum 200 with Wi-Fi channels 202 and WPAN NB channels 204 (e.g., NB O-QPSK channels discussed with reference to FIG. 1) allocations. As shown, the Wi-Fi channels 202 may have 20 MHz spacing and the WPAN NB channels 204 may have 2.5

MHz spacing. The WPAN NB channels 204 may include 50 channels located within Unlicensed National Information Infrastructure 3 (UNII-3) band and an additional 200 channels in the UNII-5 band. The total number of WPAN NB channels 204 may be 250. The 250 channels may provide about 229 channels after regulatory compliance in US/EMEA.

The location of the WPAN NB channels 204 may be configured to reduce interference with the Wi-Fi channels 202. In some embodiments, the center frequencies of each WPAN NB channels 204 may be selected such that borders of a set of WPAN NB channels 204 (e.g., NB O-QPSK channels) align with 20 MHz Wi-Fi channels 202. This may provide alignment between the Wi-Fi channels 202 and the WPAN NB channels 204 at channel boarders. Since the channels are aligned the WPAN NB channels 204 may each only overlap at most one of the Wi-Fi channels 202.

Figure 5:
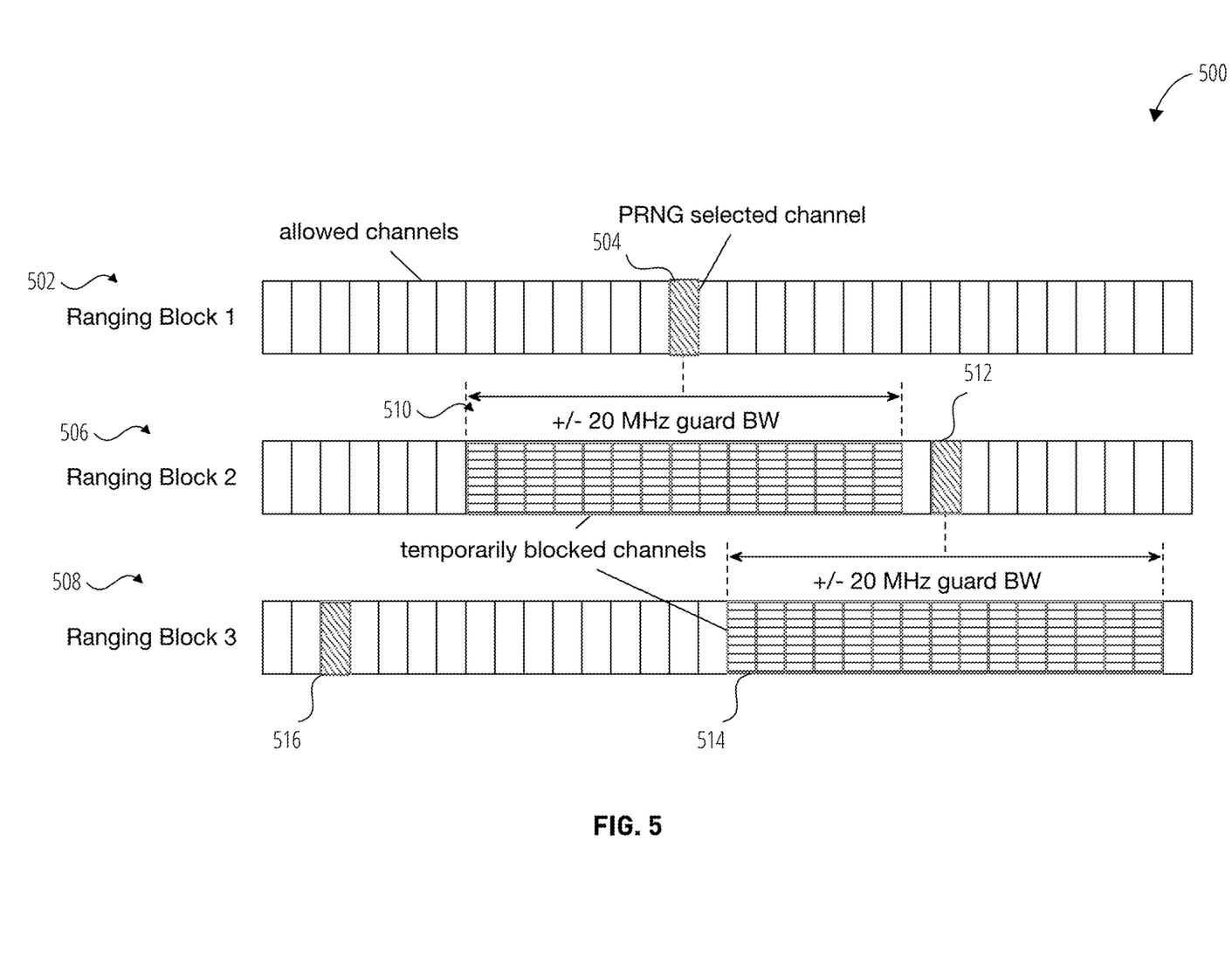
FIG. 5 illustrates a channel coordination scheme that may be used by an initiator and a responder to coordinate which channels are available for transmission in accordance with one or more embodiments.

In other words, the WPAN NB channels 204 may be aligned with IEEE 802.11 channel grid, for better coexistence. The alignment scheme may fit two NB channels of width 2.5 MHz into one legacy 5 MHz bin from IEEE 802.11. This non-overlapping allocation may reduce the chances of interference from WiFi, and reduce complexity of interference avoidance schemes (e.g., the interference avoidance scheme shown in FIG. 5). The reduction in complexity is a consequence of the circumstance that each NB channel can only interfere with at max one WiFi channel, whereas overlapping allocations can interfere 1, or 2 WiFi channels. The continuous enumeration of NB channels 1-250 spanning over multiple bands may increase the efficiency of a channel hopping scheme, as all channels can be addressed by the hopping function, as shown in FIG. 5.

In some embodiments, the center frequencies for each WPAN NB channels 204 may be selected based on the following functions. The center frequencies for the NB channel 1 to 250 may be defined as:

$$f_n = 5726.25 \text{ MHz} + (n-1) \times 2.5 \text{ MHz}, (1 \leq n \leq 50) \text{ for UNII-3}$$

$$f_n = 5926.25 \text{ MHz} + (n-51) \times 2.5 \text{ MHz}, (51 \leq n \leq 250) \text{ for UNII-5}$$

Alternatively, for improved backward compatibility with legacy 802.15.4 NB systems, the center frequencies 1 to 248 may be defined as:

$$f_n = 5727.5 \text{ MHz} + (n-1) \times 2.5 \text{ MHz}, (1 \leq n \leq 49), \text{ for UNII-3, and}$$

$$f_n = 5927.5 \text{ MHz} + (n-50) \times 2.5 \text{ MHz}, (50 \leq n \leq 248), \text{ for UNII-5.}$$

In the illustrated embodiment, the available spectrum for NB access is collocated in the UNII-3 and UNII-5 band at 5725-5850 MHz and 5925-6425 MHz. Both the UNII-3 and the UNII-5 band are used in coexistence with IEEE 802.11 and other radio technology. Since the occupied bandwidth of the O-QPSK NB radio is less than 2.5 MHz, up to 50 NB channels can be allocated for narrow-band-assist ultra-wide-band (NBA-UWB) in the UNII-3 band. Up to 200 NB channels can be allocated in the UNII-5 band. An example arrangement of IEEE 802.11 channels and NB channels is shown in FIG. 2.

The NB channel with index n may be associated and referred to the center frequency $f_n$ in the following. An overview of NB channels is giving in Table 1.

TABLE 1

| Band | Range | 802.11 Channels | NB Channel Center Frequencies | Comment |
|------|-------|-----------------|-------------------------------|---------|
| UNII-3 | 5725-5850 MHz | (144), 149-172 | $f\_1 = $ 5726.25 MHz, ..., $f\_50 = $ 5848.75 MHz | $f\_3, f\_4$ not used by 802.11 |
| UNII-5 | 5.925-6.425 MHz | 1-93 | $f\_51 = $ 5926.25 MHz, ..., $f\_250 = $ 6423.75 MHz | $f\_51$ to $f\_58$ not used by 802.11 |

Figure 3:
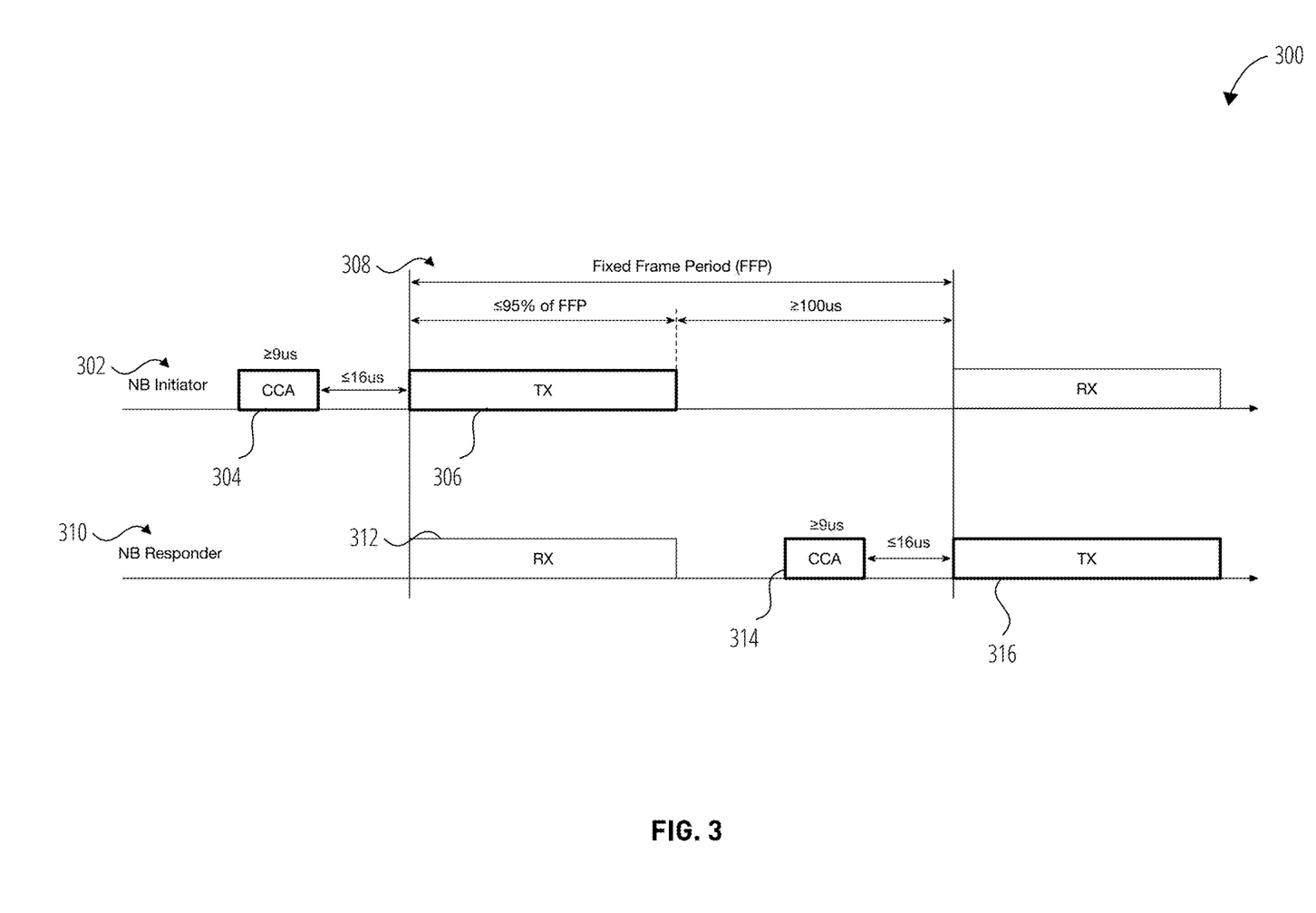
FIG. 3 illustrates a transmission sequence of an initiator and a responder using NB channels in accordance with one or more embodiments.

FIG. 3 illustrates a transmission sequence 300 of an initiator and a responder using NB channels in accordance with some embodiments. The transmission sequence 300 illustrates use of clear channel assessment (CCA) using an energy detection threshold (EDT). Regulatory requirements may require performing a CCA prior to accessing the UNII-5 band.

CCA-ED may be used by a wireless device (e.g., initiator or responder) to determine IDLE/BUSY status of NB medium. A wireless device may determine that the NB medium is BUSY when received signal strength measured over CCA-energy detect (ED) duration (T CCA-ED) exceeds CCA-ED threshold (THD CCA-ED) Otherwise, a wireless device may consider the NB medium IDLE. In some embodiments, the energy detect threshold (EDT) may be equal to −75 dBm/MHz and timings as for Frame Based Equipment (FBE).

The transmission sequence 300 shows application of a prospect ETSI regulatory requirement for performing a CCA prior to accessing the UNII-5 band. In contrast to legacy IEEE 802.11 radios operating in this band with CSMA/CA, the illustrated embodiment uses a lower complexity energy detect scheme for channel assessment. Also, the illustrated embodiment deviates from other schemes by treating NB Initiator and NB Responder as independent transceivers. Both of the NB initiator and the NB responder perform a CCA prior to transmission.

The benefit of this separation is that NB Initiator and Responder can attend to their individual timing grid. For example, a fixed frame period (FFP) set to 1 ms may be used, such that the IEEE 802.15.4 Medium Access Control (MAC) protocol for channel access can be followed. In the legacy scheme the responder is required to transmit directly after the Initiator transmits, which would be cumbersome to implement.

NB radios according to may qualify as FBE with a fixed frame period of 1 ms. Accordingly, the NB radio may perform a CCA for at least 9 μs before any attempt to transmit in the allocated NB channel. The EDT for CCA may be considered as −75 dBm/MHz. After completing the CCA if the channel is assessed clear, the NB radio may start transmission no later than 16 us after completing the CCA. If the channel is assessed occupied, the NB radio shall skip NB transmission for the current ranging block.

As shown, a subsequent CCA (e.g., responder CCA) may be performed during a fixed frame period associated with a first CCA. The subsequent CCA may be scheduled such that a second transmission may be sent during a fixed frame period directly after the fixed frame period of the first transmission.

In the illustrated embodiment, during the NB initiator timeline 302, a NB initiator may perform a CCA 304. The CCA may be greater than or equal to 9 μs. If the channel is clear (e.g., the signal strength is less than a threshold), the initiator sends a transmission 306 to the NB responder. The transmission 306 may occur at the beginning of a first slot 308 having a fixed frame period. In some embodiments, the transmission 306 may be less than or equal to 95% of the fixed frame period. This may leave at least 100 µs in the first slot 308.

During the NB responder timeline 310, the NB responder may receive 312 the transmission from the NB initiator during the first slot 308. Additionally, during the first slot 308, the responder may perform a CCA 314. The CCA may be performed at most 16 µs before the next slot so that the responder may align a transmission to the NB initiator with the next slot.

This Listen Before Talk (LBT) mechanism may be applied independently by initiator and responder in each transmission slot. The independent LBT mechanism illustrated may be applied in both the UNII-5 band and the UNII-3 band.

Figure 4:
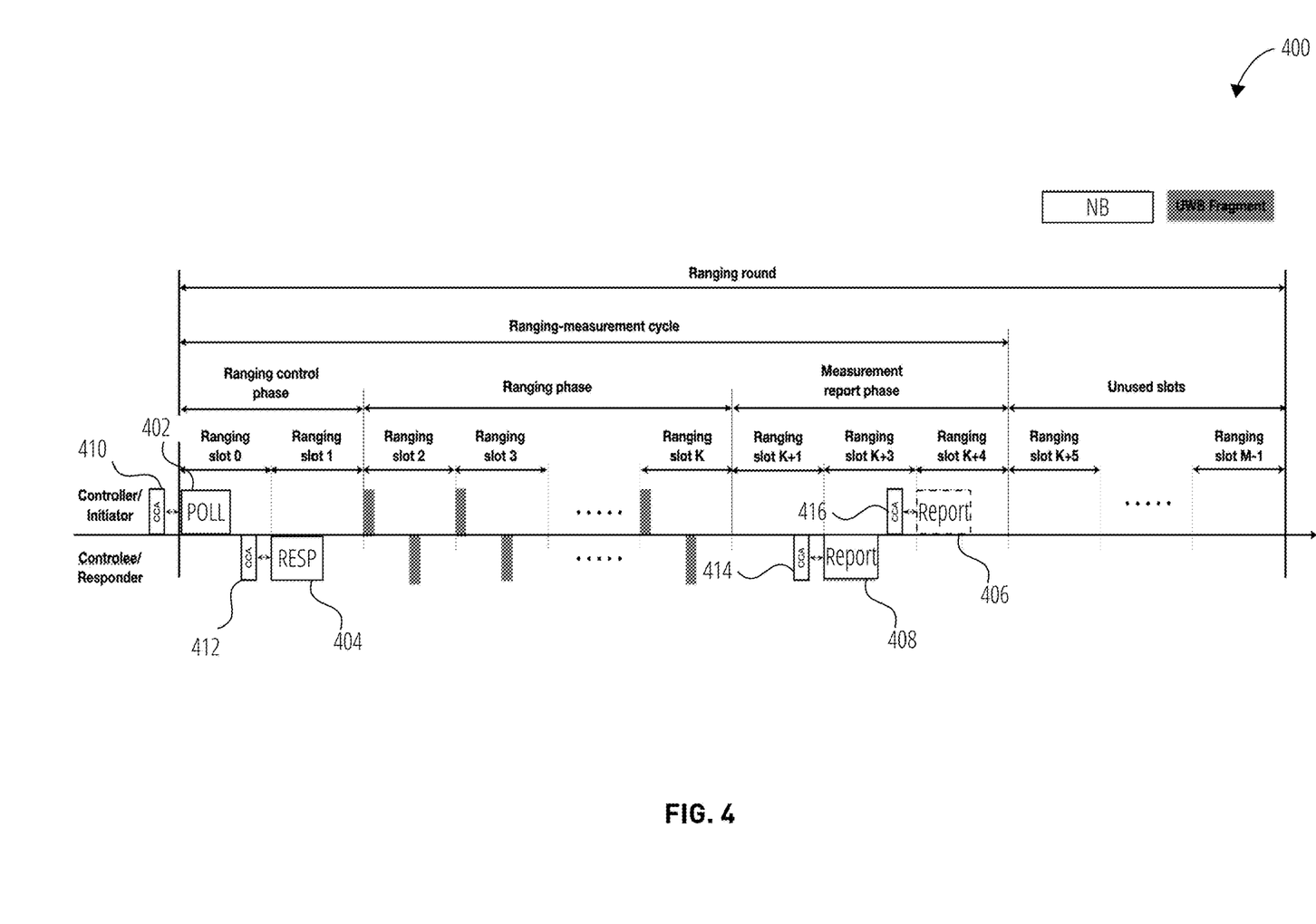
FIG. 4 illustrates a NBA-MMS-UWB transmission sequence using the LBT CCA-ED scheme from FIG. 3 in accordance with one or more embodiments.

FIG. 4 illustrates a NBA-MMS-UWB transmission sequence 400 using the LBT CCA-ED scheme from FIG. 3, in accordance with some embodiments. As shown, the initiator may perform a CCA 410 prior to a transmitting a poll frame 402 using narrow band channels. The imitator may perform the CCA 410 prior to a ranging slot and align the poll frame 402 with the beginning of the ranging slot.

The responder may perform a CCA 412 prior to a transmitting a response 404 using narrow band channels. The CCA 412 may occur during the ranging slot 0 where the poll frame 402 is located. This may allow the responder to align the response with the following slot (e.g, ranging slot 1). The responder and the controller may transmit and measure a plurality of ranging signals during the ranging phase.

The responder and the initiator may independently perform a CCA (e.g., CCA 414 and CCA 416) prior to transmitting reports (e.g., report 408 and report 406) using narrow band channels. As shown, the CCAs for the reports may be conducted during a slot before the actual report is sent, and the report may be aligned with a slot. Also as shown, the CCA 416 of the second report may be within the same slot as the first report (e.g., report 408).

FIG. 5 illustrates a channel coordination scheme 500 that may be used by an initiator and a responder to coordinate which channels are available for transmission. The channel coordination scheme 500 may facilitate NB coexistence with other radio devices using a same frequency band. For example, Wi-Fi devices may use the same frequency bands as the NB transmissions, and the channel coordination scheme 500 may help avoid continual interference between a WPAN device using the NB signaling and a Wi-Fi device.

NBA-UWB aggregates different properties of narrowband and UWB radio PHYs and application of the MAC protocols in shared spectrum in coexistence with IEEE 802.11 PHY and MAC. Since NB communication uses only a fraction of the available spectrum for transmission, a frequency diversity achieving method is defined here to assure robust NB access and mitigate the impact of NB fading.

In some embodiments, to facilitate NB coexistence with other radios, NB signaling may switch available channels every ranging block. The NB switching may reduce the number of times a channel is used that has interference. In some embodiments, the initiator and/or the responder may identify channels that are likely to have interference.

In some embodiments, an initiator and a responder may negotiate a channel allow list. The channel allow list may enlist all NB channels (1-250) that may be used during the proceedings of a ranging session. This allow list may be influenced by regulatory country rules, or a-priori knowledge about useable or unusable channels due to Wi-Fi interference. In some embodiments, this negotiation may be done once via an always-works out of band radio (e.g. Bluetooth), and prior to any NB or UWB communications. For example, an initiator coordinated macNbaUwbChannelAllowList[ ] may be established via out of band setup.

For example, a list based mechanism to coordinate a set of NB channels can be used by the initiator and the responder for NB channel access. Further, a mechanism may be used to dynamically switch among the coordinated NB channels between successive ranging blocks.

In some embodiments, a NB channel access lists may be defined using an allow list that lists allowed channels, a disallow list that lists disallowed channels, or a channel list that identifies both allowed and disallowed channels. For example, if a subset of the 250 NB channels is known to be unavailable, unusable, or deemed inefficient to be used, the initiator can mark the channels as blocked for the entire duration of an NBA-UWB session. For instance, the initiator may be additionally equipped with a IEEE 802.11.x radio and engaged in concurrent radio transmissions with other devices via a known WLAN channels. In this case the initiator may deem it favorable to exclude the conflicting set of channels being used for WLAN.

In some embodiments, if the number of allowed channels is less than the number of blocked channels, the initiator can send the list of allowed channels (e.g., macNbaUwbChannelsAllowList) to the responder. Otherwise, if the number of blocked channels is less than the number of allowed channels, the initiator can send the list of blocked channels (e.g., macNbaUwbChannelsBlockList) to the responder. Table 2 illustrates configuration variables that may be set for the channel coordination scheme 500.

TABLE 2

| Attribute | Type | Range | Description | Default |
|---|---|---|---|---|
| macNbaUwbChannelAllowList | List | — | A list of channel frequencies to be included for NB switching. | (f_1, . . . , f_250) |
| macNbaUwbChannelBlockList | List | — | A list of channel frequencies to be excluded from NB switching. | (none) |

TABLE 2-continued

| Attribute | Type | Range | Description | Default |
|---|---|---|---|---|
| macNbaUwbChannelAllowListLength | Integer | 0-250 | Number of allowed channels. | tbd |
| macNbaUwbChannelBlockListLength | Integer | 0-250 | Number of blocked channels. | 0 |
| macNbaUwbPrngFunction | Integer | 0-tbd | 0: AES-128-CTR, 1: LFSR, tbd. | 0 |
| macNbaUwbPrngSeed | Integer | 0-255 | Seed value to achieve separation between responder PRNGs | 0 |

In some embodiments, after receiving an allow list macNbaUwbChannelAllowList from the initiator, the responder can employ this list to assign a NB channels to each ranging. If the responder receives a block list macNbaUwbChannelBlockList instead, the responder may generate a complementary macNbaUwbChannelAllowList.

In some embodiments, the initiator and the responder may use a channel list to indicate that certain channels are allowed or disallowed. In some embodiments, a channel allow list may be used to indicate available channels. In some embodiments, a channel block list may be used to indicate channels as unavailable. While this channel configuration may be done prior to transmission, it may also be used to renegotiate a channel list.

In each Ranging Block both initiator and responder may use a pseudo random number generator (PRNG) to select one NB channel out of the allowed list of channels. For example, PRNG may be based on randomization AES128 in counter mode (CTR), with CTR=Ranging Block Index. This may achieve frequency diversity over a usually wide range of NB channels, and therefore improve robustness against NB channel fading and Wi-Fi interference.

Alternatively, the PRNG may be based on a linear feedback shift register (LFSR) with a polynomial of high periodicity. E.g., a LFSR with polynomial $x^{31}+x^{28}+1$ achieves high periodicity, and can be implemented efficiently on processors with register width of 31 bits, or higher. For LFSR based PRNGs, the statistical properties can be improved by performing multiple shift operations per PRNG output. For example, 8 shift operations may be performed per LFSR output.

Some embodiments may use an avoid loitering mechanism for improved 802.11 coexistence. For example, the available channels that may be selected by the PRNG may be recursive updated to avoid Wi-Fi channel loitering. For instance, to improve coexistence with Wi-Fi the PRNG from may be biased towards suppressing succeeding NB channel selections that are too close to each other. In particular, some embodiments may employ a rule set that after each channel access the allowed list of channels is temporarily modified such that all channels within the range of +/−B MHz are excluded for the next access, where B may be set to 20, 40, 80, 160, 320, or other values. This mechanism may prevent the NB radio from consecutive transmissions with Wi-Fi interference from a same channel.

In the illustrated embodiment, in the first ranging block 502, a wireless device may use PRNG to select a first transmission channel 504 from a set of allowed channels. The wireless device may then temporarily block the first transmission channel 504 from being used and block the channels within a guard bandwidth from the first transmission channel 504. In the illustrated embodiment, the guard bandwidth is set to 20 MHz. Accordingly, a temporary blocked channel set 510 may include the first transmission channel 504 and the channels 20 MHz less than and 20 MHz more than the first transmission channel 504 for a second ranging block 506. For the second range block 506, the wireless device may use PRNG to select a second transmission channel 512 outside of the temporary blocked channel set 510. In a third ranging block 508, an updated temporary blocked channel set 510 may be based on the second transmission channel 512. For the third range block 508, the wireless device may use PRNG to select a third transmission channel 516 outside of the temporary blocked channel set 514.

Figure 6:
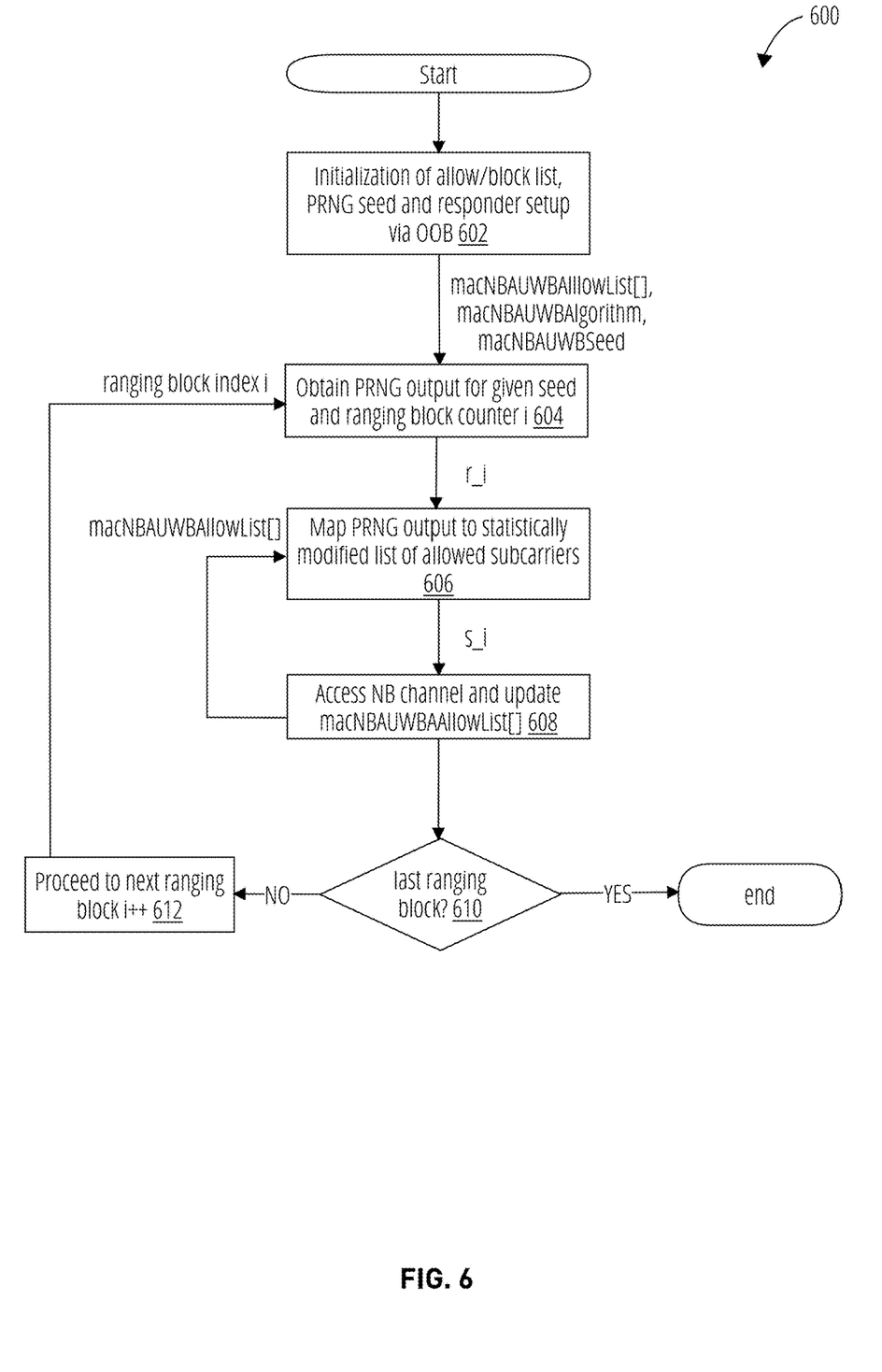
FIG. 6 illustrates a flow chart of a method 600 for NB channel switching in accordance with one or more embodiments.

FIG. 6 illustrates a flow chart of a method 600 for NB channel switching. In some embodiments, to accommodate the requirements of synchronized network access, randomness of channel choice, and statistical dependence of interference between neighboring channels the switching protocol may consist of three phases.

The first phase may comprise exchanging the required configuration, including initialization/seed values for the PRNG function, the selected NB channel bandwidth, and the lists of allowed/blocked channels. The initiator may be coordinating this phase prior to NBA-UWB communication initiation. To setup the responder, the configuration including the choice of macNbaUwbPrngFunction and macNbaUwbPrngSeed can be transferred via out-of-band (OOB) methods. The configuration may be done via OOB and may initialize 602 an allow/block list, a PRNG seed, and an NBA-UWB algorithm.

The second phase may start in a first ranging block and consist of generating a pseudo-random sequence output at both initiator and responders by means of the provided seed and configuration elements. For example, the devices may obtain 604 a PRNG output for a given seed and ranging block counter. The output may be used to select a channel for a transmission.

For macNbaUwbPrngFunction=0, the AES128(key, data) function in counter mode may be used as the PRNG, where key=macNbaUwbPrngSeed and data may be filled with the number of the associated ranging block of the channel access. The output of the PRNG     macNbaUwbPrngFunction(macNBAUWBPRNG-Seed,*i*=macRangingBlockIndex)

may then be further mapped 606 to the NB channel via the allowed list of channels as     $s_i$=macNbaUwbChannelAllowList[$r_i$ % macNbaUwbChannelAllowListLength].

This mapping can be performed by initiator and responder independently.

In the third phase, after determining the NB channel to be used, the macNbaUwbChannelAllowList may be updated 608 by initiator and responder to temporarily block neighboring NB channels within B MHz of reach of ☒, in order to guarantee that $|s_{i+1}-s_i|>B$ MHz. This temporary block of NB channels may not persist and may be reverted again after the next ranging block.

Alternatively, in the third phase, r_i may be offset by N_offset, when $|s_{i+1}-s_i|>B$ MHz is not achieved, while keeping macNbaUwbChannelAllowList unmodified. N_offset may be set to macNbaUwbChannelAllowListLength/2, resulting in a half rotation of the selected s_i among the list of allowed channels.

The wireless devices may determine 610 if the current ranging block is the last ranging block. If it is not the last ranging block, the devices proceed 612 to the next ranging block.

Figure 7:
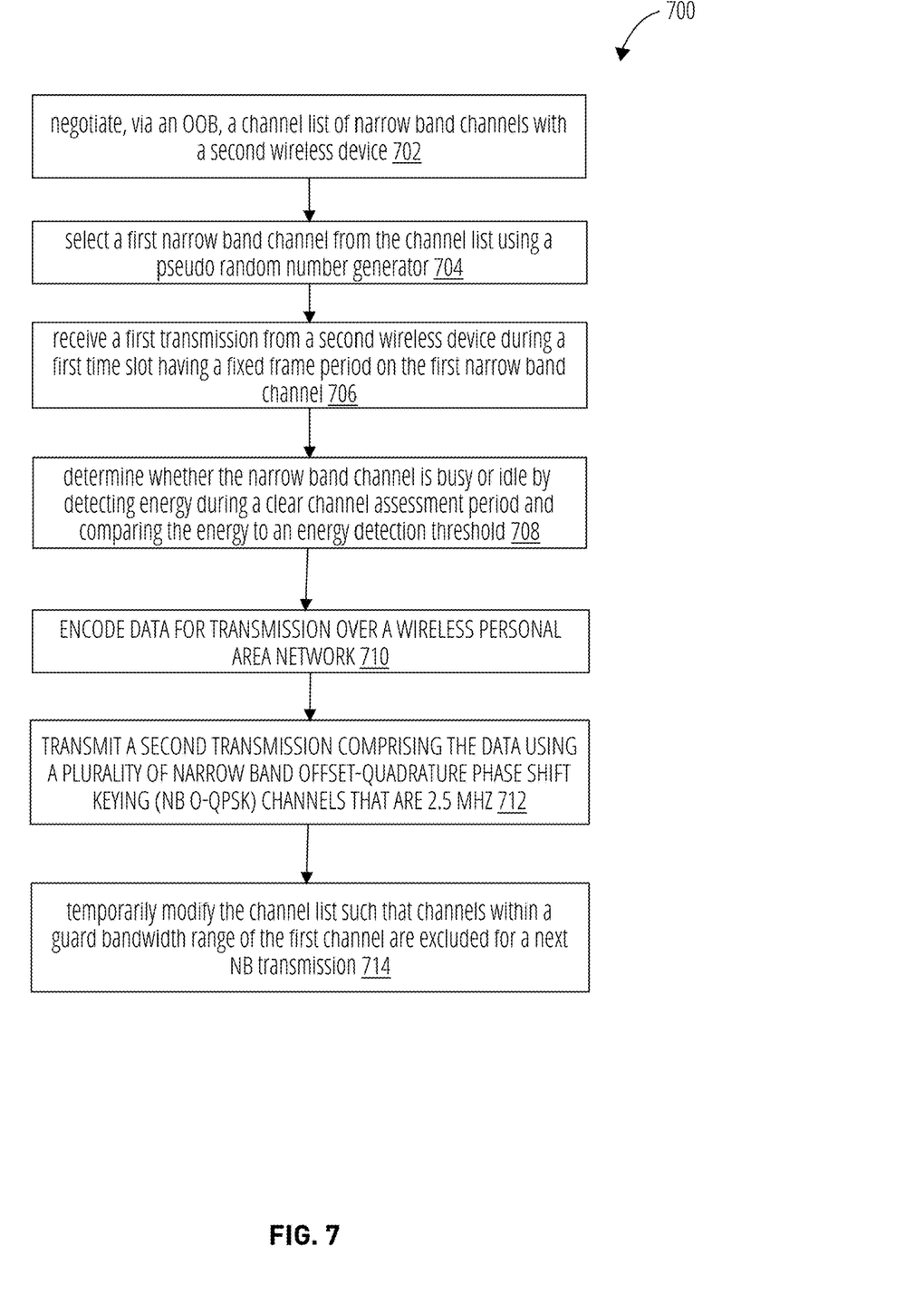
FIG. 7 illustrates a flow chart of a method 700 of a wireless device for transmitting NB signals using 2.5 MHz channels.

FIG. 7 illustrates a flow chart of a method 700 of a wireless device for transmitting NB signals using 2.5 MHz channels. The wireless device may negotiate 702, via OOB signaling, a channel list of narrow band channels with a second wireless device. The wireless device may select 704 a first narrow band channel from the channel list using a pseudo random number generator. The wireless device may receive or transmit 706 a first transmission to or from second wireless device during a first time slot having a fixed frame period on the first narrow band channel.

The wireless device may determine 708 whether the narrow band channel is busy or idle by detecting energy during a clear channel assessment period and comparing the energy to an energy detection threshold. The clear channel assessment period may occur during the first slot and after the first transmission.

When the channel is clear, the wireless device may encode 710 data for transmission over a wireless personal area network, and transmit 712 a second transmission. The second transmission use a plurality of narrow band offset-quadrature phase shift keying (NB O-QPSK) channels that are 2.5 MHz. The NB O-QPSK channels may comprise center frequencies such that borders of a set of NB O-QPSK channels align with 20 MHz Wi-Fi channels. The clear channel assessment period may be timed such that the second transmission is aligned with the beginning of the second slot.

In some embodiments, the wireless device may temporarily modify 714 the channel list such that channels within a guard bandwidth range of the first channel are excluded for a next NB transmission. The guard bandwidth range may be 20 MHz.

In some embodiments, the NB O-QPSK channels are located in Unlicensed National Information Infrastructure-3 (UNII-3) and Unlicensed National Information Infrastructure-5 (UNII-5) bands. In some embodiments, the center frequencies are:

$f_n$=5726.25 MHz+($n$−1)×2.5 MHz, (1≤$n$≤50) for UNII-3

$f_n$=5926.25 MHz+($n$−51)×2.5 MHz, (51≤$n$≤250) for UNII-5

In some embodiments, the method further comprises receiving a first transmission from an initiator during a first slot having a fixed frame period, and determining whether a narrow band medium is busy or idle. The wireless device may make that determination by detecting energy during a clear channel assessment period and comparing the energy to an energy detection threshold during the first slot and after the first transmission. In some embodiments, the first transmission comprises a poll and the second transmission comprises a response.

Figure 8:
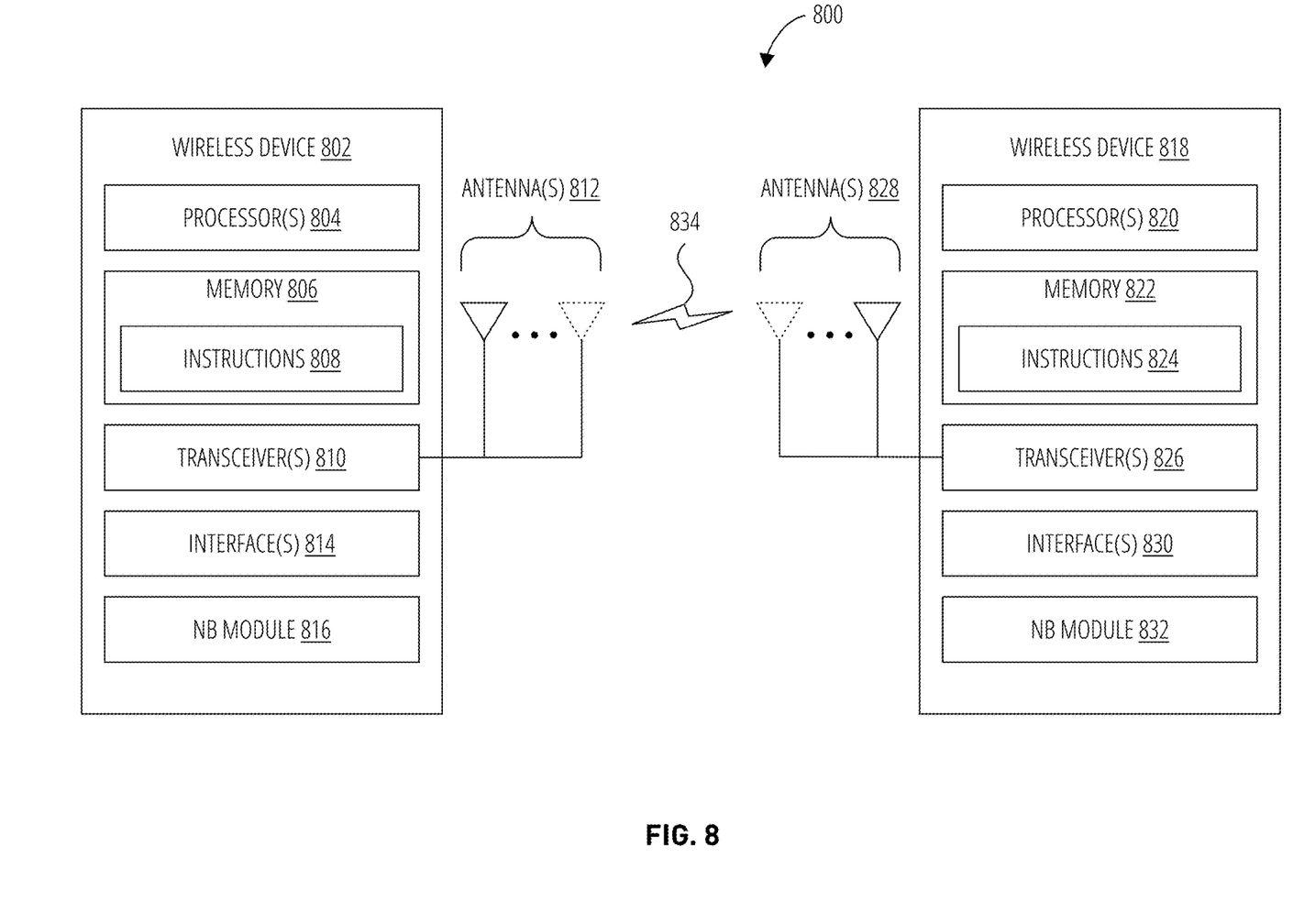
FIG. 8 illustrates a system for performing signaling between a wireless device and a network device, in accordance with one or more embodiments.

FIG. 8 illustrates a system 800 for performing signaling 834 between two wireless devices (i.e., first wireless device 802 and second wireless device 818) according to embodiments disclosed herein. The system 800 may be a portion of a wireless communications system as herein described. The wireless devices may be, for example, a user equipment (UE) of a wireless communication system, a beacon, a primary device, a controller, an initiator, a secondary device, a controlee, or a responder.

The first wireless device 802 may include one or more processor(s) 804. The processor(s) 804 may execute instructions such that various operations of the first wireless device 802 are performed, as described herein. The processor(s) 804 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The first wireless device 802 may include a memory 806. The memory 806 may be a non-transitory computer-readable storage medium that stores instructions 808 (which may include, for example, the instructions being executed by the processor(s) 804). The instructions 808 may also be referred to as program code or a computer program. The memory 806 may also store data used by, and results computed by, the processor(s) 804.

The first wireless device 802 may include one or more transceiver(s) 810 that may include radio frequency (RF) transmitter and/or receiver circuitry that use the antenna(s) 812 of the first wireless device 802 to facilitate signaling (e.g., the signaling 834) to and/or from the first wireless device 802 with other devices (e.g., the second wireless device 818) according to corresponding RATs.

The first wireless device 802 may include one or more antenna(s) 812 (e.g., one, two, four, or more). For embodiments with multiple antenna(s) 812, the first wireless device 802 may leverage the spatial diversity of such multiple antenna(s) 812 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the first wireless device 802 may be accomplished according to precoding (or digital beamforming) that is applied at the first wireless device 802 that multiplexes the data streams across the antenna(s) 812 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the first wireless device 802 may implement analog beamforming techniques, whereby phases of the signals sent by the antenna(s) 812 are relatively adjusted such that the (joint) transmission of the antenna(s) 812 can be directed (this is sometimes referred to as beam steering).

The first wireless device 802 may include one or more interface(s) 814. The interface(s) 814 may be used to provide input to or output from the first wireless device 802. For example, a first wireless device 802 that is a UE may include interface(s) 814 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver(s) 810/antenna(s) 812 already described) that allow for communication between the UE and other devices and may operate according to known protocols (e.g., Wi-Fi®, Bluetooth®, and the like).

The first wireless device 802 may include an NB module 816. The NB module 816 may be implemented via hardware, software, or combinations thereof. For example, the NB module 816 may be implemented as a processor, circuit, and/or instructions 808 stored in the memory 806 and executed by the processor(s) 804. In some examples, the NB module 816 may be integrated within the processor(s) 804 and/or the transceiver(s) 810. For example, the NB module 816 may be implemented by a combination of software components (e.g., executed by a DSP or a general processor) and hardware components (e.g., logic gates and circuitry) within the processor(s) 804 or the transceiver(s) 810.

The NB module 816 may be used for various aspects of the present disclosure, for example, aspects of FIGS. 1-6. The NB module 816 is configured to encode or decode a narrow band transmission as described in relation to FIGS. 1-6.

The second wireless device 818 may include one or more processor(s) 820. The processor(s) 820 may execute instructions such that various operations of the second wireless device 818 are performed, as described herein. The processor(s) 820 may include one or more baseband processors implemented using, for example, a CPU, a DSP, an ASIC, a controller, an FPGA device, another hardware device, a firmware device, or any combination thereof configured to perform the operations described herein.

The second wireless device 818 may include a memory 822. The memory 822 may be a non-transitory computer-readable storage medium that stores instructions 824 (which may include, for example, the instructions being executed by the processor(s) 820). The instructions 824 may also be referred to as program code or a computer program. The memory 822 may also store data used by, and results computed by, the processor(s) 820.

The second wireless device 818 may include one or more transceiver(s) 826 that may include RF transmitter and/or receiver circuitry that use the antenna(s) 828 of the second wireless device 818 to facilitate signaling (e.g., the signaling 834) to and/or from the second wireless device 818 with other devices (e.g., the first wireless device 802) according to corresponding RATs.

The second wireless device 818 may include one or more antenna(s) 828 (e.g., one, two, four, or more). In embodiments having multiple antenna(s) 828, the second wireless device 818 may perform MIMO, digital beamforming, analog beamforming, beam steering, etc., as has been described.

The second wireless device 818 may include one or more interface(s) 830. The interface(s) 830 may be used to provide input to or output from the second wireless device 818. For example, a second wireless device 818 that is a base station may include interface(s) 830 made up of transmitters, receivers, and other circuitry (e.g., other than the transceiver(s) 826/antenna(s) 828 already described) that enables the base station to communicate with other equipment in a core network, and/or that enables the base station to communicate with external networks, computers, databases, and the like for purposes of operations, administration, and maintenance of the base station or other equipment operably connected thereto.

The second wireless device 818 may include an NB module 832. The NB module 832 may be implemented via hardware, software, or combinations thereof. For example, the NB module 832 may be implemented as a processor, circuit, and/or instructions 824 stored in the memory 822 and executed by the processor(s) 820. In some examples, the NB module 832 may be integrated within the processor(s) 820 and/or the transceiver(s) 826. For example, the NB module 832 may be implemented by a combination of software components (e.g., executed by a DSP or a general processor) and hardware components (e.g., logic gates and circuitry) within the processor(s) 820 or the transceiver(s) 826.

The NB module 832 may be used for various aspects of the present disclosure, for example, aspects of FIGS. FIGS. 1-6. The NB module 832 is configured to encode or decode a narrow band transmission as described in relation to FIGS. 1-6.

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for a wireless device, the method comprising:
encoding data for transmission over a wireless personal area network; and
transmitting the data using a plurality of narrow band offset-quadrature phase shift keying (NB O-QPSK) channels,
wherein the NB O-QPSK channels comprise a channel spacing of 2.5 MHz, and
wherein the NB O-QPSK channels comprise center frequencies such that borders of a set of NB O-QPSK channels align with 20 MHz Wi-Fi channels.

2. The method of claim 1, wherein the NB O-QPSK channels are located in Unlicensed National Information Infrastructure-3 (UNII-3) and Unlicensed National Information Infrastructure-5 (UNII-5) bands.

3. The method of claim 2, wherein the center frequencies are:

$f_n = 5726.25$ MHz $+ (n-1) \times 2.5$ MHz, $(1 \leq n \leq 50)$ for UNII-3

$f_n = 5926.25$ MHz $+ (n-51) \times 2.5$ MHz, $(51 \leq n \leq 250)$ for UNII-5.

4. The method of claim 1, further comprising:
receiving a first transmission from an initiator during a first slot having a fixed frame period;
determining whether a narrow band medium is busy or idle by:
detecting energy during a clear channel assessment period during the first slot and after the first transmission, and
comparing the energy to an energy detection threshold; and
sending, when the narrow band medium is idle, a second transmission to the initiator during a second slot, the second slot having a length of the fixed frame period, wherein the clear channel assessment period is timed such that the second transmission is aligned with a beginning of the second slot.

5. The method of claim 4, wherein the first transmission comprises a poll and the second transmission comprises a response.

6. The method of claim 1, further comprising performing a ranging sequence by:
negotiating, via out-of-band (OOB) channel signaling, a channel list of narrow band channels with a second wireless device, wherein the channel list that indicates available narrow band channels;
selecting a first narrow band channel from the channel list using a pseudo random number generator;
transmitting a first signal on the first narrow band channel; and
temporarily modifying the channel list such that channels within a guard bandwidth range of the first narrow band channel are excluded for a next transmission.

7. The method of claim 6, wherein the guard bandwidth range is 20 MHz.

8. A wireless communication system comprising:
an initiator configured to:
determine whether a narrow band medium is busy or idle by detecting energy during a first clear channel assessment period and comparing the energy to an energy detection threshold, and
send, when the narrow band medium is idle, a first transmission to a responder during a first fixed frame period; and
the responder configured to:
receive the first transmission,
determine whether the narrow band medium is busy or idle by detecting the energy during a second clear channel assessment period within the first fixed frame period and comparing the energy to the energy detection threshold, and
send, when the narrow band medium is idle, a second transmission to the initiator during a second fixed frame period.

9. The wireless communication system of claim 8, wherein the first clear channel assessment period occurs during a prior fixed frame period such that the first transmission is aligned with a beginning of the first fixed frame period.

10. The wireless communication system of claim 8, wherein the second clear channel assessment period is timed within the first fixed frame period such that the first transmission is aligned with a beginning of the second fixed frame period.

11. The wireless communication system of claim 8, wherein the first clear channel assessment occurs at most 16 µs before the first fixed frame period.

12. The wireless communication system of claim 8, wherein the second clear channel assessment occurs at most 16 µs before the second fixed frame period.

13. The wireless communication system of claim 8, wherein the initiator and the responder are further configured to perform a ranging sequence by:
negotiating, via out-of-band (OOB) channel signaling, a channel list of narrow band channels with a second wireless device, wherein the channel list that indicates available narrow band channels;
selecting a first narrow band channel from the channel list using a pseudo random number generator;
transmitting a first signal on the first narrow band channel; and temporarily modifying the channel list such that channels within a guard bandwidth range of the first narrow band channel are excluded for a next transmission.

14. The wireless communication system of claim 13, wherein the guard bandwidth range is 20 MHz.

15. A wireless device comprising:
a processor; and
a memory storing instructions that, when executed by the processor, configures the wireless device to:
negotiate a channel list of narrow band channels with a second wireless device, wherein the channel list that indicates available narrow band channels;
select a first narrow band channel from the channel list using a pseudo random number generator;
transmit a first signal on the first narrow band channel; and
temporarily modify the channel list such that channels within a guard bandwidth range of the first narrow band channel are excluded for a next transmission.

16. The wireless device of claim 15, wherein the memory storing instructions further configures the wireless device to recursively update the channel list to exclude channels within the guard bandwidth range of a last transmission.

17. The wireless device of claim 15, wherein the guard bandwidth range is 20 MHz.

18. The wireless device of claim 15, wherein the memory storing instructions further configures the wireless device to:
receive a first transmission from an initiator during a first slot having a fixed frame period;
determine whether a narrow band medium is busy or idle by:
detecting energy during a clear channel assessment period during the first slot and after the first transmission, and
comparing the energy to an energy detection threshold; and
send, when the narrow band medium is idle, a second transmission to the initiator during a second slot, the second slot having a length of the fixed frame period, wherein the clear channel assessment period is timed such that the second transmission is aligned with a beginning of the second slot.

19. The wireless device of claim 18, wherein the first transmission comprises a poll and the second transmission comprises a response.

20. The wireless device of claim 18, wherein the clear channel assessment period occurs at most 16 μs before the fixed frame period and lasts for at least 9 μs.

* * * * *